(12) United States Patent
Jarocki

(10) Patent No.: US 9,139,074 B2
(45) Date of Patent: Sep. 22, 2015

(54) METHODS AND DEVICES FOR POSITIONING A TRACTION BATTERY ON A HYBRID OR ELECTRIC VEHICLE

(71) Applicant: FORD GLOBAL TECHNOLOGIES, INC., Dearborn, MI (US)

(72) Inventor: Corey John Jarocki, Harrison Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 14/157,475

(22) Filed: Jan. 16, 2014

(65) Prior Publication Data

US 2015/0197144 A1 Jul. 16, 2015

(51) Int. Cl.
*B60K 1/00* (2006.01)
*B60K 1/04* (2006.01)

(52) U.S. Cl.
CPC ............ *B60K 1/04* (2013.01); *B60K 2001/0438* (2013.01)

(58) Field of Classification Search
USPC .............. 180/65.1, 65.21, 68.5, 274; 29/412; 296/187.03, 187.05, 187.08, 187.11
See application file for complete search history.

(56) References Cited

U.S. PATENT DOCUMENTS

| | | | | |
|---|---|---|---|---|
| 7,051,825 B2 * | 5/2006 | Masui et al. | ................. | 180/68.5 |
| 7,688,582 B2 | 3/2010 | Fukazu et al. | | |
| 8,079,435 B2 | 12/2011 | Takasaki et al. | | |
| 8,936,125 B2 * | 1/2015 | Nakamori | ..................... | 180/68.5 |
| 8,939,242 B2 * | 1/2015 | Kurakawa et al. | ............ | 180/65.1 |
| 2004/0033415 A1 * | 2/2004 | Chen et al. | ........................ | 429/99 |
| 2005/0173170 A1 * | 8/2005 | Miyajima et al. | ............ | 180/68.5 |
| 2006/0016633 A1 * | 1/2006 | Fujii et al. | ..................... | 180/68.5 |
| 2007/0284167 A1 * | 12/2007 | Watanabe et al. | ............ | 180/68.5 |
| 2008/0156554 A1 * | 7/2008 | Noto | ............................. | 180/65.3 |
| 2008/0196957 A1 * | 8/2008 | Koike et al. | ................... | 180/68.5 |
| 2009/0166116 A1 * | 7/2009 | Kiya et al. | ..................... | 180/68.5 |
| 2009/0183935 A1 * | 7/2009 | Tsuchiya | ..................... | 180/68.1 |
| 2010/0307848 A1 | 12/2010 | Hashimoto et al. | | |
| 2010/0320794 A1 | 12/2010 | Maceri et al. | | |
| 2012/0118655 A1 | 5/2012 | Ogihara et al. | | |

* cited by examiner

*Primary Examiner* — Toan To
(74) *Attorney, Agent, or Firm* — David B. Kelley; Brooks Kushman P.C.

(57) ABSTRACT

Vehicles incorporating various methods and devices for mounting a fraction battery include securing the traction battery to a structural member of the vehicle in a manner that releases the traction battery from the structural member of the vehicle in response to an external load applied to the fraction battery that exceeds a threshold. A mounting member includes a slot for guiding movement of the battery away from the external load to reduce or eliminate compressive loading of the battery. Fasteners include a guide portion that cooperates with the slot and a shear portion that secures the battery in a first position but separates from the guide portion in response to the external load to allow the battery to move to a second position away from the external load.

18 Claims, 6 Drawing Sheets

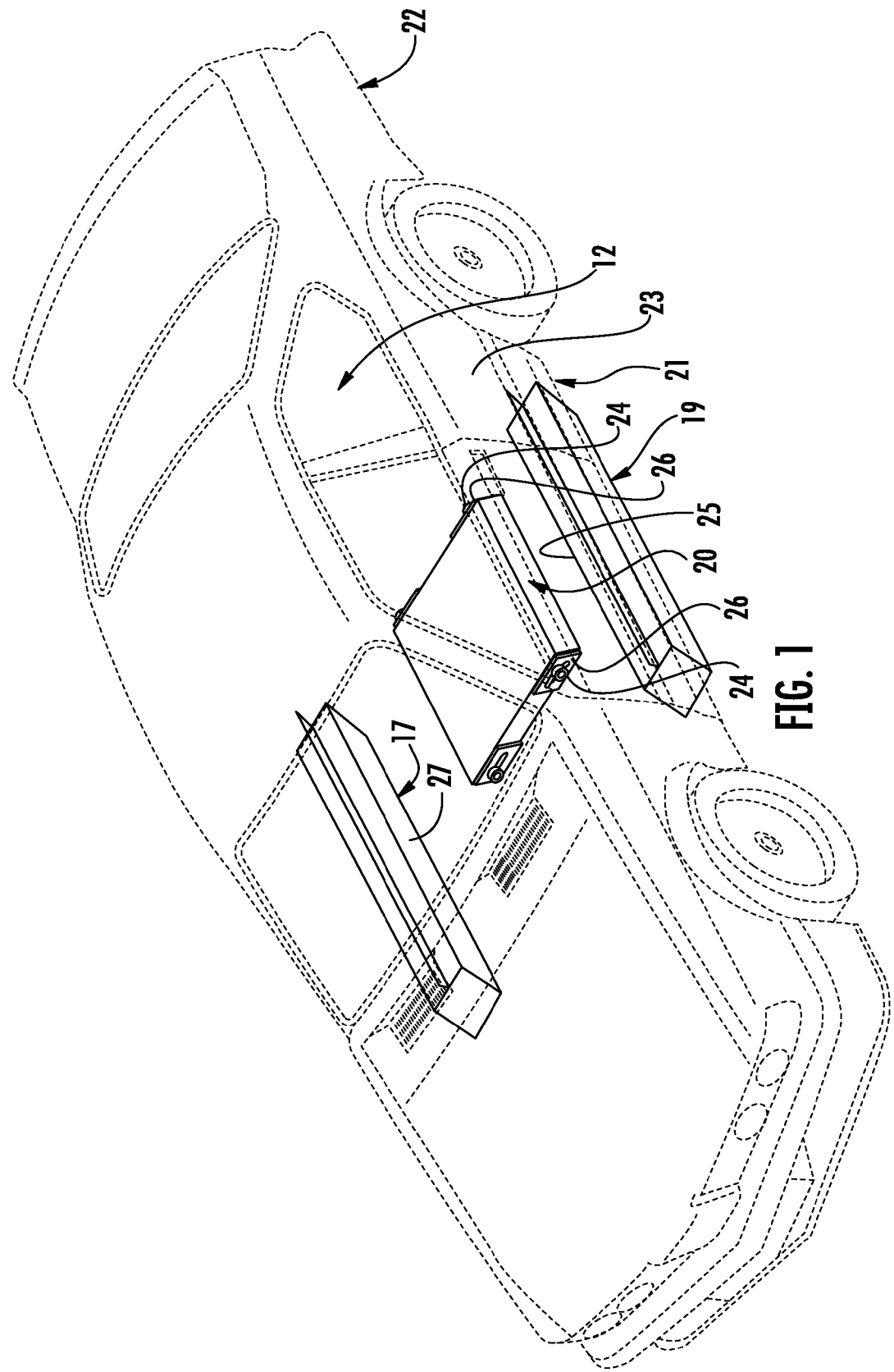

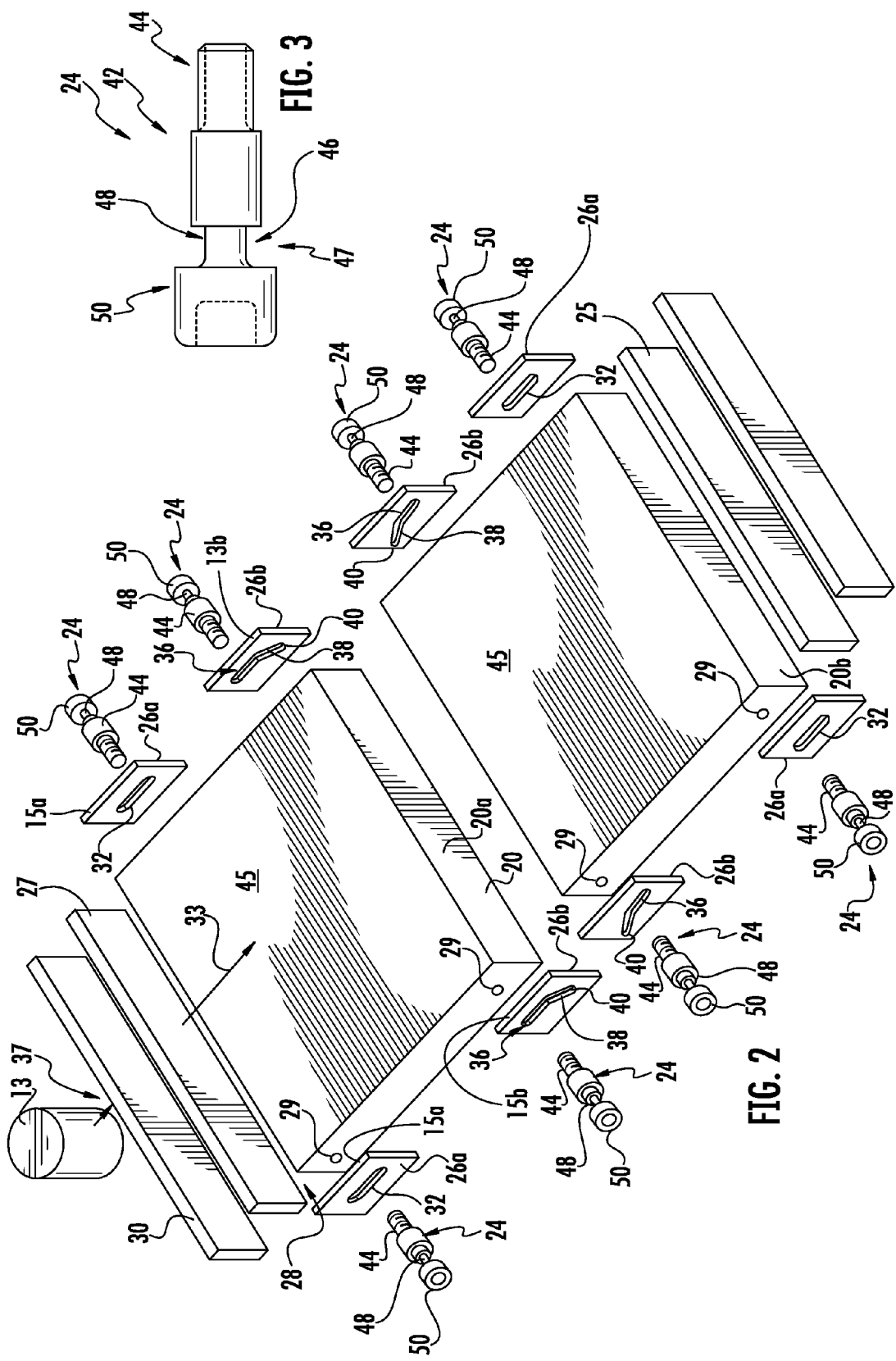

METHODS AND DEVICES FOR POSITIONING A TRACTION BATTERY ON A HYBRID OR ELECTRIC VEHICLE

TECHNICAL FIELD

This disclosure relates to methods and devices for positioning a traction battery on a hybrid or electric vehicle.

BACKGROUND

Hybrid and electric vehicles include high voltage battery packs that provide power to a traction motor and other vehicle components. The large size and weight of the battery packs presents various challenges with respect to packaging of the battery pack in the vehicle. Various vehicle designs have positioned battery packs in the rear of the vehicle generally behind the passenger cabin to meet design goals with respect to comfort, handling, etc.

SUMMARY

Embodiments according to the present disclosure include a vehicle having a body and a traction battery. The traction battery is releasably secured to the vehicle body using a fastening member having a guide portion integrally connected to a shear portion and a traction battery mounting member. The traction battery mounting member cooperates with the fastening member, wherein, in response to a force exceeding a threshold, the shear portion separates from the guide portion and the guide portion moves within the mounting member to change a position of the traction battery. The position of the traction battery is changed to avoid a vehicle component, such as a sidewall, a rocker panel, a driveshaft, a propshaft, or an exhaust where applicable. The traction battery may be disposed between a sidewall and the driveshaft. When the vehicle receives a force exceeding a threshold, the traction battery may move toward the driveshaft to reduce or eliminate compressive loading of the traction battery. The traction battery may include a housing that defines a depression that accommodates a portion of the vehicle driveshaft for improved packaging.

Other aspects of the present disclosure include the mounting member defining a slot that receives the guide portion of the fastening member and guides movement of the battery in response to the force exceeding the threshold. The slot may be of various forms including a lateral slot, or a lateral slot having one angled portion, or a lateral slot having a pair of angled portions on either side. One or more additional mounting members may be provided. The additional mounting member(s) may define a slot having one of the three previously described forms.

Another aspect of this disclosure relates to a vehicle having a traction battery with an associated mounting system. The mounting system includes a guide configured to guide traction battery movement between first and second positions. The mounting system also includes a securing device that connects the traction battery to a vehicle structural component until an external force acting on the traction battery exceeds a first threshold, and in response, allows the traction battery to move toward the second position. The securing device may include a spring. Alternatively, the mounting system may include a pin having a head connected to an integrally formed guide portion by a necked-down shear portion. The necked-down shear portion has a shear strength that corresponds to the first threshold. The guide includes a slot having a parallel portion associated with the first position, and one or more angled portions associated with the second position, such that the second position is lower than the first position.

Other aspects of this disclosure relate to a method for mounting a traction battery in a vehicle including securing the traction battery to a vehicle structural member such that the traction battery is released from the vehicle structural member in response to an external load applied to the traction battery that exceeds a threshold. The method may include guiding the movement of the traction battery between a first position secured to the structural member toward a second position in response to the external load exceeding the threshold. The second position may be located farther away from a passenger cabin of the vehicle than the first position. The threshold may correspond to a vehicle impact exceeding an associated vehicle speed at impact. The method may further include securing the traction battery with a guide pin connected to the traction battery and having a necked-down portion that shears in response to the external load exceeding the threshold.

Other aspects of the present disclosure relate to a vehicle having a driveshaft, a traction battery, and a drop down mounting assembly that attaches the traction battery to the vehicle in between an underside of the vehicle and the driveshaft. The drop down mounting assembly includes a mounting member and a fastening member configured to attach the traction battery to the mounting member. The fastening member includes a guide portion and shear portion. The shear portion separates from the guide portion in response to a force exceeding a threshold. The mounting member defines a slot. The guide portion of the fastening member slides along the slot to change the position of the traction battery relative to the driveshaft when the traction battery receives the force exceeding the threshold.

The vehicle may have a first rocker panel and a second rocker panel opposite the first rocker panel. A first traction battery may be positioned between the first rocker panel and the driveshaft, and a second traction battery may be positioned between the driveshaft and the second rocker panel. The first traction battery or the second traction battery move toward the driveshaft in response to the force exceeding the threshold. The first or second traction batteries may also move away from their respective adjacent rocker panels in response to the force exceeding the threshold.

Various embodiments of a vehicle having a traction battery mounting system according to the present disclosure may have associated advantages. For example, a traction battery mounting system that allows motion in response to a force exceeding a threshold may reduce or eliminate compressive loading and any associated damage to the battery as a result of a vehicle impact. This facilitates positioning of the traction battery below the vehicle cabin, which may lower the vehicle center of gravity. Positioning the battery below the passenger cabin may exploit battery pack stiffness to complement body structure stiffness and improve ride and handling of the vehicle.

The above advantages and other advantages and features of the present disclosure will be readily apparent from the following detailed description of the preferred embodiments when taken in connection with the accompanying drawings.

BRIEF DESCRIPTION OF THE DRAWINGS

FIG. 1 is a schematic view of a vehicle illustrating a representative embodiment of a method and device for positioning a traction battery in a vehicle;

FIG. 2 is an exploded view of a representative embodiment of a drop down assembly for mounting a pair of traction batteries to an underside of a vehicle having an underbody tunnel between the traction batteries;

FIG. 3 is a front view of a mounting fastener according to various embodiments of the present disclosure;

DETAILED DESCRIPTION

Figure 4A:
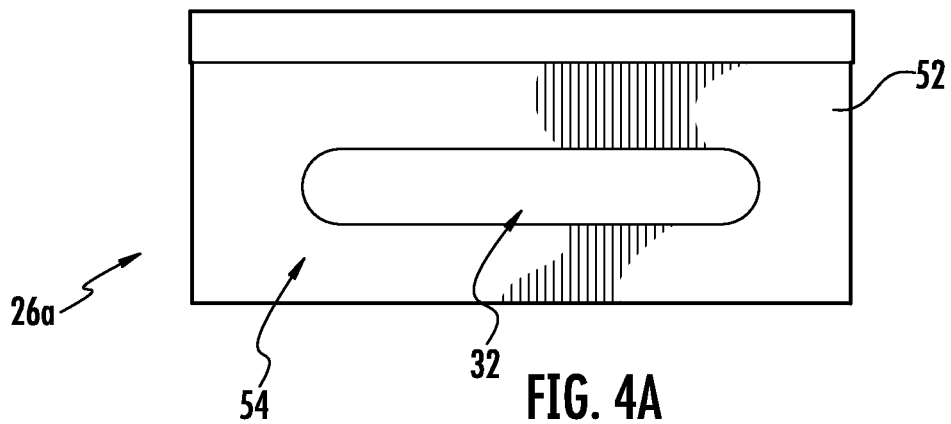
FIG. 4A is a front view of a mounting member embodiment defining an elongated slot.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the teachings of the disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. The present disclosure utilizes various spatial references, such as "top," "bottom," "horizontal," and "sides." The present disclosure also provides specific shapes of certain structures, such as the fastener slot. Some of the descriptions also specify the number of components that may be used, such as the number of mounting members. These spatial references, references to shapes, and references to the numbers of components that may be utilized are merely used for providing clear descriptions. They should not be construed in any limiting manner.

The present disclosure relates to various methods and devices for positioning a battery, such as a traction battery, on a vehicle, such as an electric or a hybrid vehicle. FIG. 1 shows a method for positioning a battery on a vehicle wherein the battery 20 is attached to a body 23 of the vehicle 22 and is positioned below a cabin 12 of the vehicle 22. The battery 20 may be mounted to the underside 21 of the body 23, which may be surrounded by structural components represented by opposing sidewalls 25 and 27 in this embodiment. Opposing sidewalls 25 and 27 may be provided adjacent to their respective rocker panels, 17 and 19, or they may be the rocker panels themselves. The battery 20 may be attached to the underside 21 via a drop down assembly or mounting system that includes a plurality of fasteners 24 and mounting members 26. The various methods and devices according to embodiments of the present disclosure provide alternatives to the approach of placing the battery in the trunk with corresponding advantages as previously described.

FIG. 2 shows an embodiment of a mounting system for a pair of traction batteries 20a and 20b separated by an underbody tunnel, which may be used to accommodate a driveshaft or propshaft of the vehicle, for example. The traction batteries 20 may be encased in respective housings 45. Mounting members 26a-b cooperate with guiding fasteners 24 to releasably secure housings 45 to structural members of the vehicle as described in greater detail below. In one embodiment, the top sides 15a-b of the mounting members 26a-b are attachable to the body 23 of the vehicle, such as to the underside 21 by welding. Mounting members 26a-b may include a flange or similar device (FIGS. 4A-4C) to facilitate welding or other attachment to the underside of the vehicle.

The housing 45 defines mounting holes 29 configured to receive fasteners 24 through mounting members 26a-b. The battery 20 may be positioned to provide a gap 28 between the battery 20 and a vehicle sidewall 27. The gap 28 may provide a crumple zone in the event that the vehicle sidewall 27 folds or deforms toward the battery when the vehicle sidewall 27 receives a force that exceeds a threshold, such as a side impact from another vehicle or object 13.

As illustrated by the representative embodiment of FIG. 2, the battery 20 is mounted or releasably secured to the vehicle 22 such that the battery 20 is allowed to move away from a point of impact 37, such as an impact in the direction shown by arrow 33. The battery 20 is secured to a structural member of the vehicle using mounting members 26a-b in a manner that releases the battery from the structural member in response to an external load applied to the battery that exceeds an associated threshold, such as a shear threshold of a necked down portion of fasteners 24. The external load then shears fastener 24 and separates a shear portion 46 from a guide portion 42 of fastener 24. The battery movement or position is then guided by movement of guide portion 42 within associated slots 32, 36 of mounting members 26a, 26b, respectively, to move the battery 20 between a first position and a second position away from the impact to reduce or eliminate compressive loading of the housing 45 and battery 20.

As described in greater detail herein, the mounting members may have various designs to guide the battery movement between a first position and a second position with the first and second positions depending on the particular application and implementation. For example, positioning of various vehicle components, such as a driveshaft, exhaust, or other components may be considered when selecting the battery movement trajectory to reduce or eliminate compressive loading of the battery housing and any resulting damage to the battery. Similarly, other devices may be used to releasably secure the battery in the first position and release the battery for travel to the second position in response to an external force exceeding a threshold. For example, the battery could be secured in the first position by one or more springs with a spring force corresponding to the desired impact threshold. However, mounting with springs may not provide the desired stiffness for vehicle ride and handling considerations.

FIG. 3 illustrates a representative embodiment of a fastener for use in releasably securing a traction battery to a structural member of a vehicle according to the present disclosure. Fastener 24 may include a body 42 having a guide portion 42 and a shear portion 46. The guide portion 42 may include a threaded portion 44 that engages corresponding threaded holes 29 of the housing 45 of the battery 20. Shear portion 46 includes a necked down or reduced diameter/strength portion 48 and a fastener head 50 configured to drive fastener 24. As previously described, shear portion 46, and particularly necked down portion 48 is designed to shear and separate from guide portion 42 in response to a lateral or shear force exceeding a corresponding threshold. The threshold may be selected to release the battery in response to an impact considering the combined shear strength of all the fasteners 24 used to secure the battery 20 in a first position.

While the representative embodiments described provide lateral movement of the battery in response to a side impact or other lateral force, various applications may include similar features to provide longitudinal movement of the battery in response to a front or rear impact, for example. The desired first and second positions, as well as the movement trajectory of the battery between the first and second positions may vary depending on the particular application and implementation.

Figure 4B:
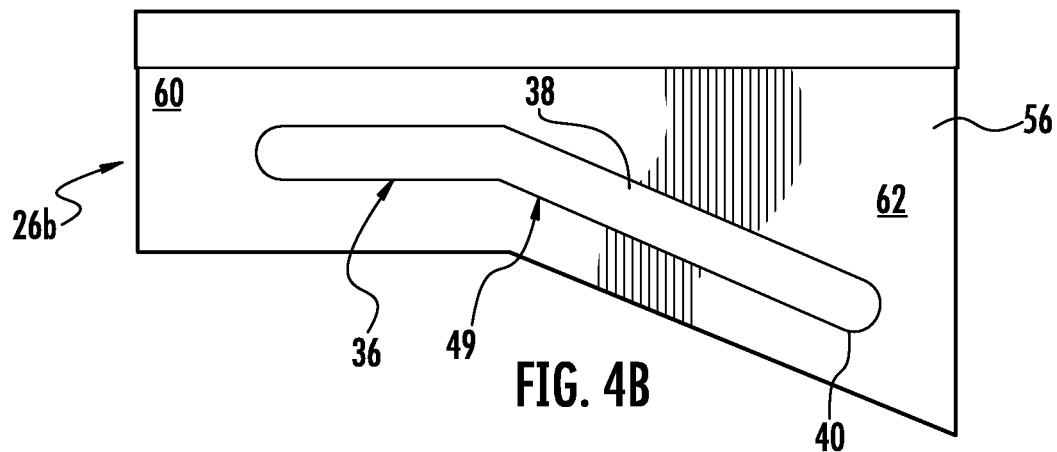
FIG. 4B is a front view of a mounting member embodiment defining an angled guide slot.
Figure 4C:
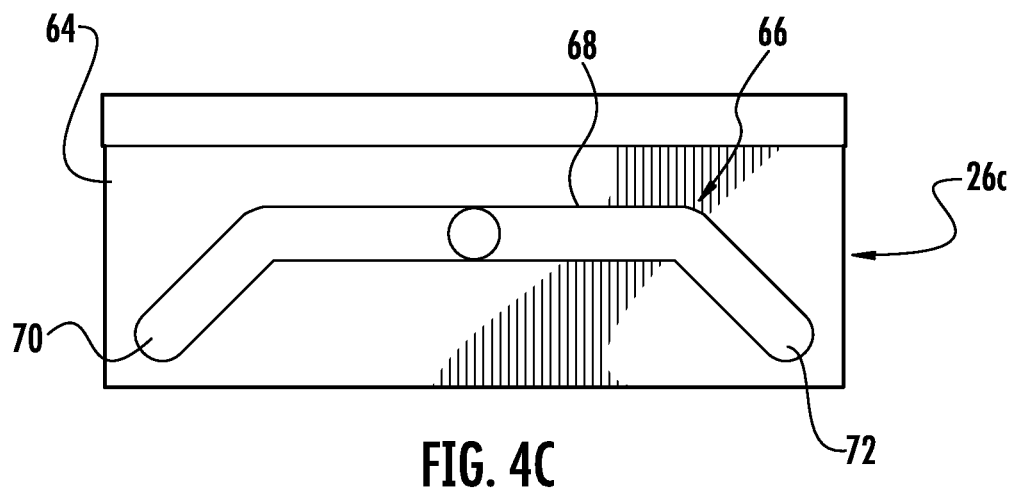
FIG. 4C is a front view of a mounting member embodiment defining an elongated slot with angled slot portions on both ends of the elongated portion.

FIGS. 4A-4C illustrate representative embodiments of mounting members that may be used to guide movement of a fraction battery releasably secured to a structural component of the vehicle in response to a force exceeding a corresponding threshold according to the present disclosure. The embodiments illustrate various guide slots to guide battery movement between a first (secured) position and a second (released) position. The mounting member embodiment 26a in FIG. 4A includes a mounting plate 52 that defines an elongated slot 32 having rounded ends 54. The elongated slot 32, which may be referred to as a lateral slot 32, allows lateral movement of the guide portion of the fastener within the slot after separation from the shear portion in response to a load exceeding the shear threshold of the fastener. In one embodiment, the elongated slot 32 may be oriented generally horizontally and parallel to the ground or the underside of the vehicle. Mounting plate 52 includes a flange along a top edge to facilitate attachment to the vehicle.

FIG. 4B shows a mounting member embodiment 26b having an alternative elongated slot for guiding movement of the battery between a first position and a second position. Mounting member 26b includes a mounting plate 56 that defines a fastener guide slot 49. Fastener guide slot 49 includes a generally horizontal portion 36 and an angled portion 38. The angled portion 38 slants downward from the generally horizontal portion 36. The generally horizontal portion 36 allows the battery to move laterally, and the angled portion 38 allows the battery to drop down, lower, or move from a position where it is hanging in the elongated slot 36 (or raised position) to a position where it is hanging in the lowest part 40 of the angled portion 38 (or lowered position). Mounting plate 56 may have a rectangular shape similar to mounting plate 52, or it may be shaped as illustrated with a narrow portion 60 defining the horizontal portion 36 and a wide portion 62 defining the angled portion 38 of elongated slot 49. Mounting member 26b also includes a mounting flange along a top edge to facilitate welding or other attachment to the vehicle underbody.

FIG. 4C shows another embodiment of a mounting member 26c. Mounting member 26c includes a mounting plate 64 that defines an elongated slot 66. Slot 66 includes a lateral portion 68 and a pair of angled legs 70 and 72 connected to each end of the lateral portion 68. Mounting member 26c includes a mounting flange along the top for welding or other attachment to the vehicle underbody. The embodiment illustrated in FIG. 4B may be used to provide lateral and downward movement of the battery in response to a side impact from either direction. As previously described, the particular configuration of the guide slot may vary depending on the packaging of surrounding vehicle components. While the representative embodiments illustrated elongated slots that allow lateral movement and/or downward movement, other embodiments may include slots having an upward angled portion. However, downward angled portions facilitate the use of gravity in allowing the battery to move away from an external loading to reduce or eliminate compressive loading of the battery.

The mounting members 26a-c along with their respective fasteners 24 form a mounting system or a drop down mounting assembly for releasably securing the traction battery to the vehicle. Different combinations of mounting member embodiments 26a, 26b, or 26c may be utilized resulting in various forms of mounting systems or drop down mounting assemblies. For example, a battery 20 may be mounted to a vehicle with a drop down assembly or mounting system that includes all mounting members in the form of mounting member embodiment 26a. In other embodiments, a drop down assembly may utilize a pair of mounting members such as represented in embodiment 26a on one side, and a pair of mounting members as represented by embodiment 26b on the opposite side (such as the drop down assembly shown in FIGS. 2 and 5). In another embodiment, a mounting system may utilize mounting members that are all of the form represented by embodiment 26c, as shown in FIG. 6.

As previously described, the mounting members 26a, 26b, or 26c cooperate with the fasteners 24 or similar devices to facilitate movement of the traction battery along a desired path or trajectory in response to a force exceeding a threshold. The fastener head 50 secures the battery 20 at a fixed position relative to a mounting member 26a, 26b, or 26c prior to a predetermined impact or load. Upon receiving the predetermined impact or load, the necked down shear portion 48 separates from fastener head 50 releasing the battery from the fixed position. The battery moves between the first secured position and a second released position as the guide portion of each fastener moves within an associated elongated slot of the mounting member. At the first position, the battery 20 is initially fixedly attached or firmly mounted to the underside 21 such that it may not move or detach from its respective drop down assembly or mounting system. At the second position, depending on the shape of the fastener slot, the battery 20 may move laterally or may move from a raised position to a lowered position.

Referring back to FIG. 2, if a force exceeding a predefined threshold is received at impact point 37, the shear notch 48 of the mounting fastener 24 breaks detaching the fastener head 50. The predefined threshold may be selected based on a side impact from a vehicle or other object travelling over a predefined speed, for example. The smooth surface of the guide portion 44 of the mounting fastener 24 preferably slides within the elongated slot 32 of mounting member embodiment 26a and slot 36 of mounting member embodiment 26b allowing the battery to move away from the point of impact 37 to reduce or eliminate compressive loading of the battery enclosure 45 and battery 20. The battery may drop down on the side where it is mounted to the mounting member embodiment 26b, as the guide portion of the mounting fastener slides down on the angled slot portion 38 to its lowest point 40. As the battery 20 drops down, the battery 20 moves away from a passenger cabin 12 of the vehicle.

Figure 5:
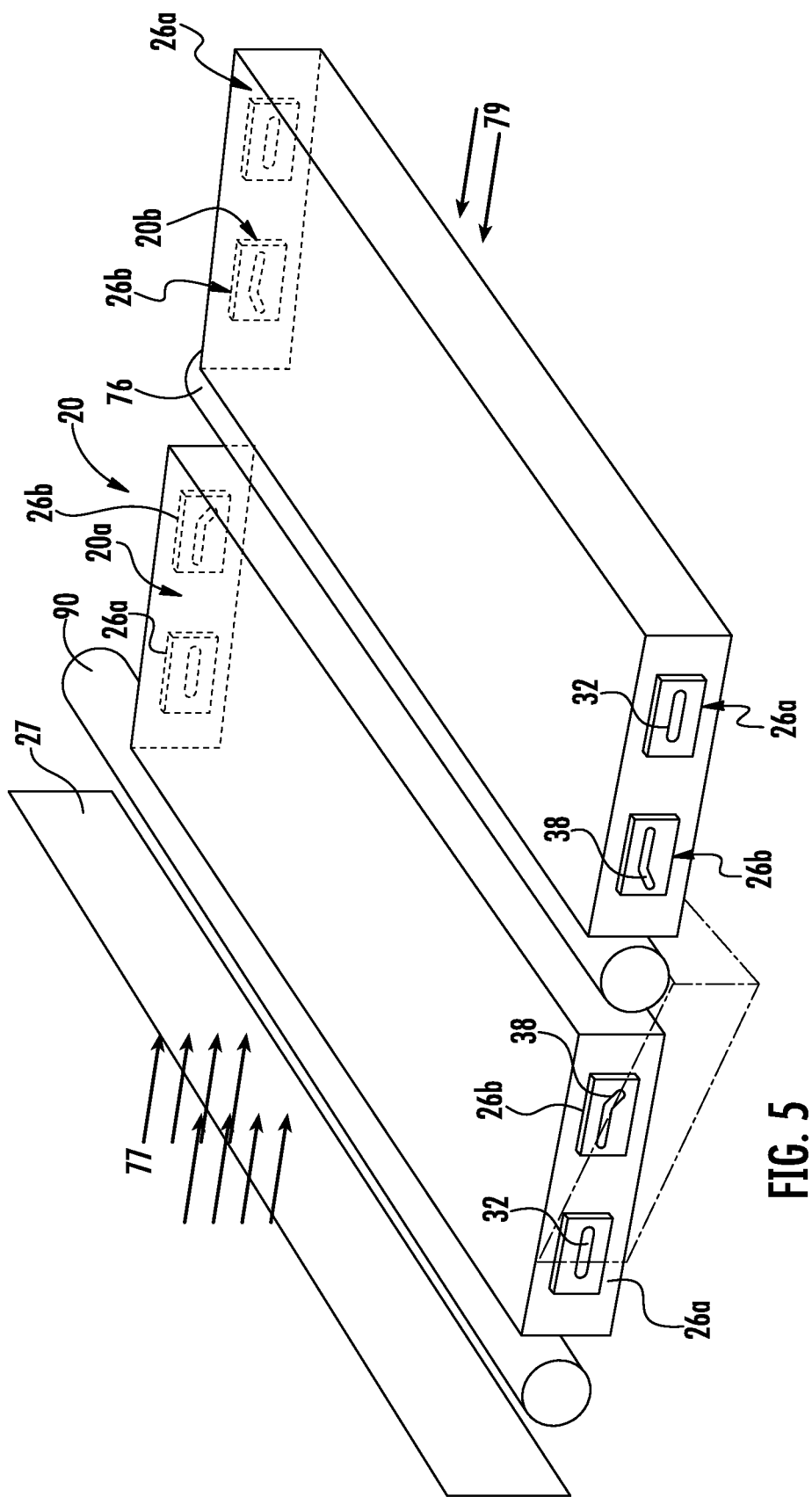
FIG. 5 is a schematic view of the drop down assembly of FIG. 2 showing the movement of one of the batteries in response to a force exceeding a threshold according to embodiments of the present disclosure.
Figure 6:
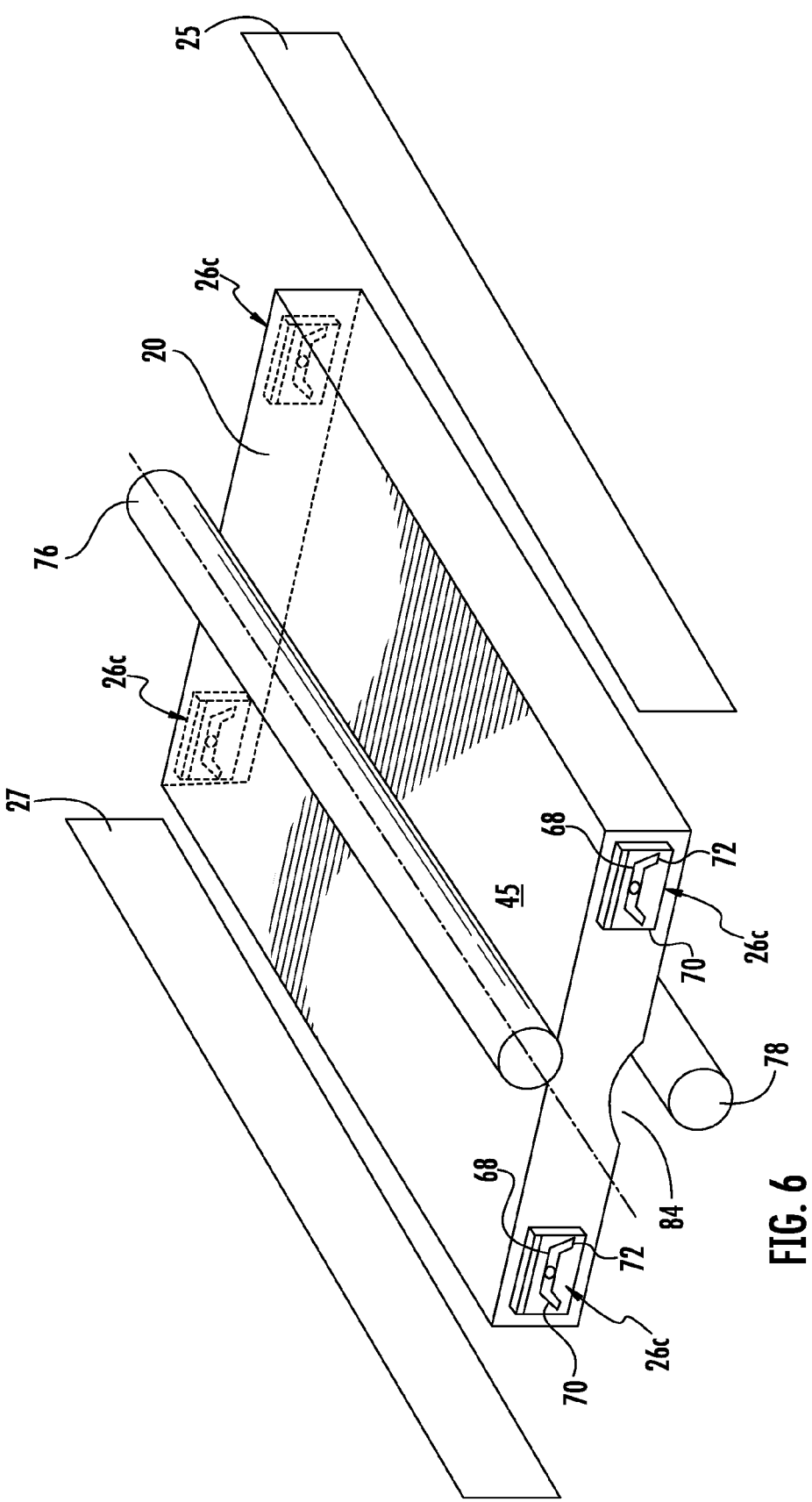
FIG. 6 is a schematic view of another method and device for positioning a battery in a vehicle according to various embodiments of the present disclosure.

Referring to FIG. 5, the mounting system of FIG. 2 is used on a vehicle that has a component such as a drive shaft or exhaust 90 in a first underbody tunnel next to a sidewall 27 and a component such as a drive shaft or exhaust 76 in a second underbody tunnel separating the two battery packs 20a and 20b. The first and second underbody tunnels, respectively, may accommodate components other than a propshaft or driveshaft in electric vehicles, or an exhaust for hybrid vehicles. The mounting system has mounting members 26a having lateral slots 32 attached on both sides of battery pack 20a that are adjacent to the first underbody tunnel, and mounting members 26b having angled slots 38 attached on both sides of battery pack 20b adjacent to the second underbody tunnel. In response to a lateral or side impact exceeding a predefined threshold in the direction 77, the battery 20 slides laterally then drops down to avoid the second underbody tunnel. The second battery pack 20b also includes mounting members 26a having lateral slots 32 attached on both sides of battery pack 20b that are away from the second underbody tunnel and mounting members 26b having angled slots 38 attached on both sides of battery pack 20b adjacent to the second underbody tunnel. In response to an impact exceeding a predefined threshold in the direction 79, the second battery pack also slides laterally away from the point of impact and drops down to avoid the second underbody tunnel and components housed therein.

FIG. 6 shows another mounting system and method of positioning a traction battery 20 relative to an underbody tunnel and related components therein, as generally represented by reference numerals 76, 78. The mounting system has mounting members that are all in the form of mounting member embodiment 26c. The traction battery 20 is in a housing 45 having a bottom medial portion that defines a depression 84 to accommodate, at least partially, a component 78, such as a vehicle exhaust. Upon impact, the shear notch of the mounting fastener breaks detaching the fastener head. The smooth surface of the guide portion of the mounting fastener slides along the lateral portion 68 allowing the battery to move away from the point of impact. The battery drops down from the underside of the vehicle as the guide portion of the mounting fastener slides down respective angled legs 70 or 72.

Figure 7:
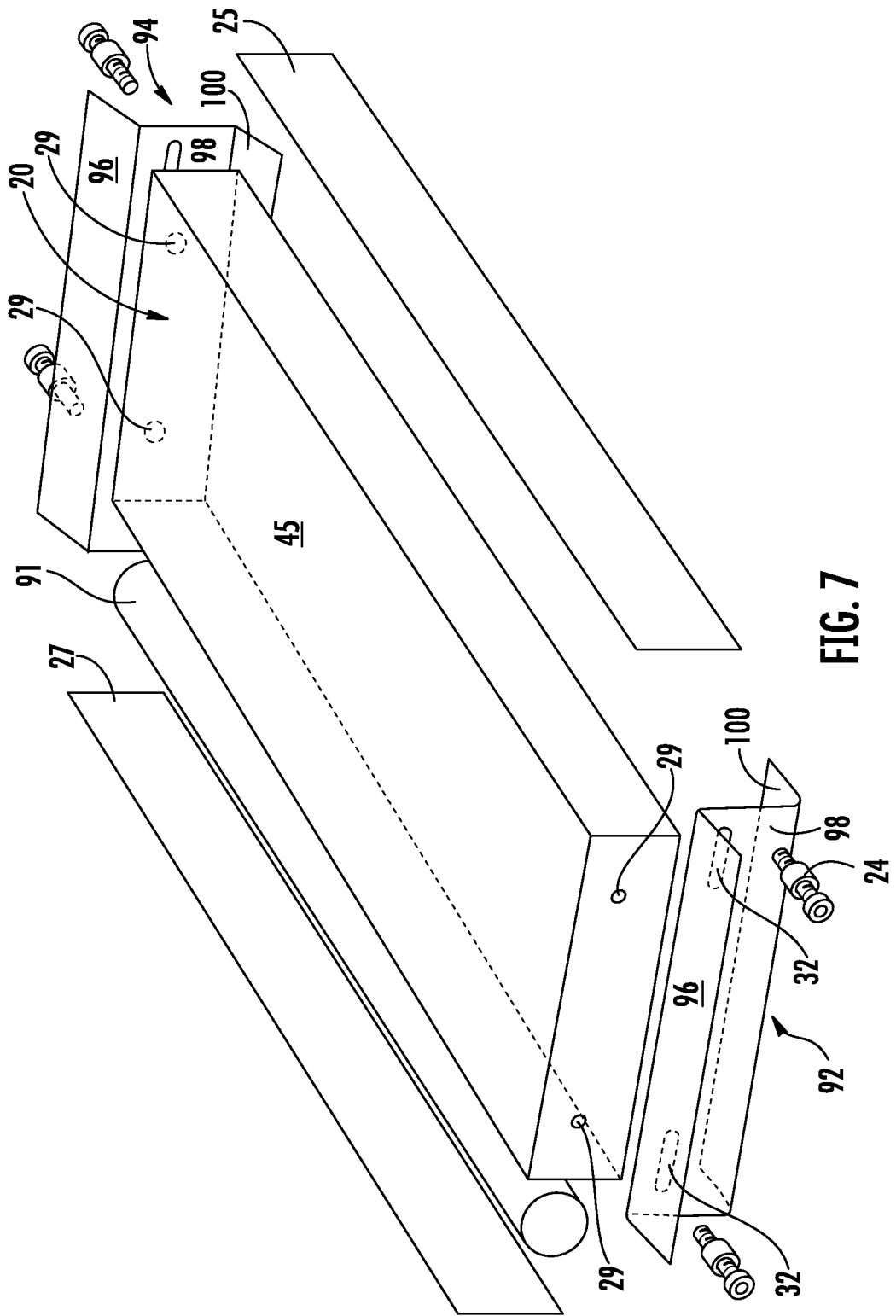
FIG. 7 is a schematic view of another method and device for positioning a traction battery in a vehicle according to various embodiments of the present disclosure.

Referring to FIG. 7, another system or method for positioning a battery 20 in a vehicle is shown. The battery 20 may be a single pack encased in a housing 45 that is positioned adjacent to an underbody component or tunnel 91. The underbody tunnel 91 may include a propshaft or exhaust, for example. The battery 20 is mounted to the vehicle by a pair of mounting brackets 92 and 94 attached to the opposing ends of the battery 20 with fasteners 24. Mounting brackets 92 and 94 include a Z-shaped structure in this embodiment. The Z-shaped structure includes a top surface or flange 96, a wall member 98 substantially perpendicularly attached to the top surface 96, and a bottom surface 100 attached to the wall member 98. The wall member 98 defines a lateral fastener slot 32. The mounting brackets 92 and 94 may be attached to the vehicle by attaching the top surface 96 to the underside 21 of the vehicle, such as by welding. The wall member 98 may be fastened by fasteners 24 to the battery housing 45 through the lateral fastener slot 32 and mounting holes 29 defined by the housing 45. The bottom surface 100 supports the battery.

In response to an impact that exceeds a predefined threshold, the shear notch 48 of the mounting fastener 24 preferably breaks detaching the fastener head 50. The guide portion 44 of the mounting fastener 24 slides laterally along slot 32 allowing the battery 20 to slide on the bottom surface 100 and move away from a point of impact to reduce or eliminate compressive loading of the battery.

As demonstrated by various embodiments of the present disclosure, batteries of vehicles may effectively be positioned below the vehicle cabin while mitigating compressive loading associated with side impacts. This may lower the vehicle center of gravity and improve ride and handling.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A vehicle having a body and a traction battery, comprising:
a fastening member including a guide portion integrally connected to a shear portion; and
a traction battery mounting member fixed to the body and cooperating with the fastening member, wherein, in response to a force exceeding a threshold, the shear portion separates from the guide portion and the guide portion moves within the traction battery mounting member to change a position of the traction battery.

2. The vehicle of claim 1, wherein the mounting member defines a slot configured to receive the guide portion of the fastening member, the guide portion moving within the slot in response to the force exceeding the threshold.

3. The vehicle of claim 2, wherein the slot comprises a lateral portion connected to an angled portion.

4. The vehicle of claim 2, wherein the slot comprises a lateral portion disposed between a pair of angled portions.

5. The vehicle of claim 1 wherein the mounting member defines a horizontal slot configured to allow the guide portion of the fastening member to move laterally in response to the force exceeding the threshold and further comprising a second mounting member defining an angled slot that allows the traction battery to move away from the body.

6. The vehicle of claim 1, wherein the mounting member defines a lateral slot.

7. The vehicle of claim 1 further including first and second traction batteries positioned on opposite sides of an underbody tunnel wherein the mounting member includes a slot having a downward angled portion to move at least a portion of the battery below components in the underbody tunnel in response to the force exceeding the threshold.

8. A vehicle having a traction battery with associated mounting system, comprising:
a guide secured to a vehicle underbody and configured to guide traction battery movement; and
a securing device including at least one spring connecting the traction battery to a vehicle structural component in a first position until an external force acting on the traction battery exceeds a first threshold, and in response, allowing traction battery movement toward a second position determined by the guide.

9. The vehicle of claim 8 wherein the securing device comprises a pin having a head connected to an integrally formed guide portion by a necked-down shear portion having a shear strength corresponding to the first threshold.

10. The vehicle of claim 8 wherein the guide defines a slot having a generally horizontal portion associated with the first position, and an angled portion associated with the second position, such that the second position is lower than the first position.

11. A method for mounting a traction battery in a vehicle, comprising:
securing the traction battery to a structural member of the vehicle in a first position;
releasing the traction battery from the structural member of the vehicle by shearing a fastener having a guide portion to guide movement of the traction battery in response to an external load that exceeds a corresponding threshold; and
guiding movement of the traction battery between the first position and a second position in response to the external load exceeding the threshold.

12. The method of claim 11 wherein guiding comprises guiding at least a portion of the traction battery away from a passenger cabin of the vehicle.

13. The method of claim 11 wherein the threshold corresponds to a vehicle impact exceeding an associated vehicle speed at impact.

14. The method of claim 11 wherein securing comprises securing the traction battery with a guide pin connected to the traction battery and having a necked-down portion that shears in response to the external load exceeding the threshold.

15. A vehicle comprising:
an underbody tunnel;
a traction battery; and
a drop down mounting assembly attaching the traction battery to the vehicle between a side body of the vehicle and the underbody tunnel, the drop down mounting assembly including a mounting member that defines a slot and a fastening member configured to attach the traction battery to the mounting member, the fastening member including a guide portion and a shear portion that separate in response to a force exceeding a threshold, to allow the guide portion to slide along the slot to change a position of the traction battery relative to the underbody tunnel.

16. The vehicle of claim 15 wherein the traction battery moves toward the underbody tunnel in response to the force exceeding the threshold, the traction battery defining a depression configured to accommodate at least a portion of the underbody tunnel.

17. The vehicle of claim 15, further comprising a rocker panel, wherein when the vehicle receives an impact, the traction battery moves away from the rocker panel.

18. The vehicle of claim 15, further comprising:
a first rocker panel;
a second rocker panel opposite the first rocker panel;
a first traction battery positioned between the first rocker panel and the underbody tunnel; and
a second traction battery positioned between the underbody tunnel and the second rocker panel, wherein one of the first traction battery and the second traction battery move toward the underbody tunnel upon a vehicle side impact exceeding a threshold.

* * * * *